United States Patent
Furusawa et al.

(10) Patent No.: US 7,194,245 B2
(45) Date of Patent: Mar. 20, 2007

(54) HIGH-FREQUENCY SIGNAL RECEIVING APPARATUS

(75) Inventors: Toshihiro Furusawa, Gifu (JP); Akira Fujishima, Aichi (JP); Hirotoshi Takeuchi, Gifu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 430 days.

(21) Appl. No.: 10/468,816

(22) PCT Filed: Jan. 21, 2003

(86) PCT No.: PCT/JP03/00465

§ 371 (c)(1),
(2), (4) Date: Aug. 25, 2003

(87) PCT Pub. No.: WO03/063371

PCT Pub. Date: Jul. 31, 2003

(65) Prior Publication Data

US 2004/0067744 A1    Apr. 8, 2004

(30) Foreign Application Priority Data

Jan. 22, 2002    (JP)    .............................. 2002-012517

(51) Int. Cl.
*H04B 1/26* (2006.01)
(52) U.S. Cl. ...................... 455/318; 455/296
(58) Field of Classification Search ................ 455/296, 455/318
See application file for complete search history.

(56) References Cited

U.S. PATENT DOCUMENTS

| | | | |
|---|---|---|---|
| 4,315,333 A | * | 2/1982 | Yamashita et al. ........ 455/189.1 |
| 4,792,939 A | | 12/1988 | Hikita et al. |
| 6,006,081 A | | 12/1999 | Moore |
| 6,125,268 A | * | 9/2000 | Boesch et al. ........... 455/168.1 |
| 6,400,420 B1 | | 6/2002 | Kim |
| 2003/0015707 A1 | * | 1/2003 | Bosco et al. .................. 257/73 |
| 2004/0036165 A1 | * | 2/2004 | Ammar ...................... 257/723 |
| 2005/0095998 A1 | * | 5/2005 | Toncich ...................... 455/129 |

FOREIGN PATENT DOCUMENTS

| | | |
|---|---|---|
| JP | 59-81925 | 5/1984 |
| JP | 62-92399 | 4/1987 |
| JP | 5-53331 | 7/1993 |
| JP | 6-69829 | 3/1994 |
| JP | 8-298393 | 11/1996 |
| JP | 9-275355 | 10/1997 |
| JP | 2002-305691 | 10/2002 |
| JP | 2002-368641 | 12/2002 |
| KR | 2000-0043103 | 7/2000 |

* cited by examiner

*Primary Examiner*—Duc M. Nguyen
*Assistant Examiner*—Eric J Elcenko
(74) *Attorney, Agent, or Firm*—Wenderoth, Lind & Ponack, L.L.P.

(57) ABSTRACT

A high-frequency signal receiver includes a mixer having one port for receiving an input signal and another port for receiving an output from a local oscillator, a filter for receiving an output from the mixer, and an output terminal to which an output from the filter is supplied. At least the mixer and the filter are formed of balanced circuits, so that they have high capability of eliminating interference. Distances between the circuits thus can be short. Further, partition plates for shielding the interference are not needed, thus allowing the receiver to be small.

4 Claims, 4 Drawing Sheets

HIGH-FREQUENCY SIGNAL RECEIVING APPARATUS

TECHNICAL FIELD

The present invention relates to a high-frequency signal receiver for receiving high-frequency signals, such as television signals.

BACKGROUND ART

FIG. 6 is a block diagram of a conventional high-frequency signal receiver. The receiver includes input terminal 1 for receiving a high-frequency signal, input circuit 2 to receive the signal received at input terminal, mixer 3 for receiving an output from input circuit 2 at its first input port, and for receiving an output from local oscillator 4 at its second input port, and filter 5 for receiving an output from mixer 3, second mixer 7 for receiving an output from filter 5 at its first input port and for receiving an output from second local oscillator 6 at its second input port, demodulator 8 for receiving an output from second mixer 7, phase locked loop (PLL) circuit 10 loop-coupled to local oscillator 4, and crystal oscillator 11 coupled to PLL circuit 10. The circuits are formed of unbalanced circuits, and, as shown in FIG. 7, are partitioned by metal partition plates 12 and covered by metal frame 13.

In the conventional receiver discussed above, harmonics of an oscillation signal of crystal oscillator 11 may enter into mixer 3, filter 5 or input circuit 2. To prevent an interference due to the signal, the circuits are placed apart from each other at an adequate distance, or local oscillator 4, PLL circuit 10, and crystal oscillator 11 are partitioned with metal plates 12 and covered with metal frame 13. Those measures against the interference cause the receiver to become bulky.

SUMMARY OF THE INVENTION

A high-frequency signal receiver includes a local oscillator, a mixer formed of a balanced circuit having one port receiving a high-frequency signal and another port receiving an output from the local oscillator, and a filter formed of a balanced circuit for receiving an output from the mixer.

The receiver, including the above circuits, which hardly interfere with each other, can be small.

DESCRIPTION OF THE PREFERRED EMBODIMENTS

Embodiment 1

Figure 1:
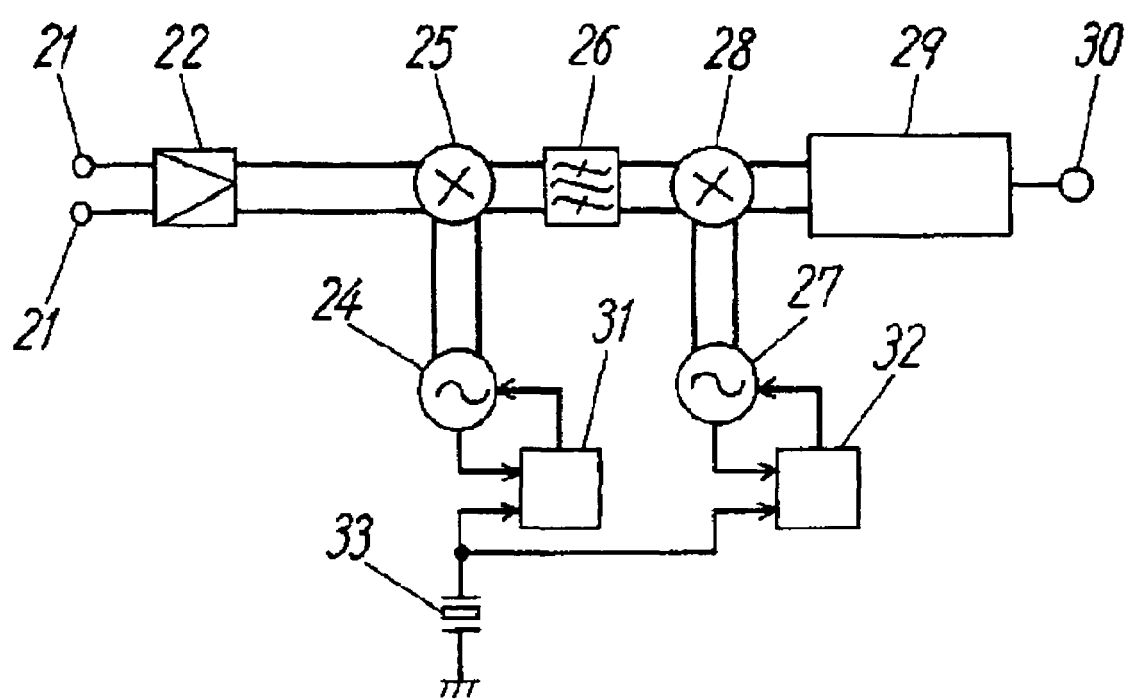
FIG. 1 is a circuit diagram of a high-frequency signal receiver in accordance with exemplary embodiment 1 of the present invention.

FIG. 1 is a circuit diagram of a high-frequency signal receiver in accordance with exemplary embodiment 1 of the present invention. Two high-frequency signals are supplied to input terminal 21 from an antenna. Those signals are balanced signals, such as a digital television (TV) signals, i.e., the signals have amplitudes identical to each other and phases reverse to each other. Low-noise amplifier 22 coupled to input terminal 21 amplifies the high-frequency signals. Mixer 25 receives a signal output from low-noise amplifier 22 at its first input port, and receives an output from first local oscillator 24 at its second input port.

First mixer 25 mixes an oscillating signal of local oscillator 24 with an output signal from low-noise amplifier 22, and converts the high-frequency signal supplied to input terminal 21 into an intermediate-frequency signal having a frequency of maximum 1.5 times that of the high-frequency signal. According to embodiment 1, the receiver receives high-frequency signals including TV broadcasting signals ranging from approximately 50 MHz to 800 MHz. The intermediate-frequency signal, having a frequency of 1.2 GHz, is resistant to receive interference caused by second-order and third order distortion of the input signals.

Surface acoustic wave (SAW) filter 26 receiving an output from first mixer 25 has a pass-band corresponding to a band of the TV broadcasting signal, and the center frequency of the pass-band is the frequency of the intermediate-frequency signal. SAW filter 26 has sharp attenuation characteristics to have only necessary signals pass through and to have useless signals eliminated.

For receiving both of analog TV broadcasting signals and digital TV broadcasting signals, the receiver needs to accept respective bands for those TV signals. The SAW filter has a pass-band of 6 MHz. When only digital audio signals are received, a SAW filter having a pass-band of 0.428 MHz is used as SAW filter 26. According to embodiment 1, since the intermediate frequency is 1.2 GHz, SAW filter 26 can be small, thus allowing the receiver to be small.

Second mixer 28 receives an output from SAW filter 26 at its first input port, and receives an output signal from local oscillator 27 at its second input port. According to embodiment 1, second mixer 28 includes a first mixing section and a second mixing section. The first mixing section mixes the signal supplied from local oscillator 27 with the signal from SAW filter 26, and the second mixing section mixes a signal having a phase shifted by 90 degrees from the signal supplied from local oscillator 27 with the signal from SAW filter 26. Both of the mixing sections detect directly the signals from SAW filter 26, respectively, for extracting color signals, i.e., I and Q signals. This arrangement can eliminate an independent detector, thereby allowing the high-frequency signal receiver to be small. In this case, the oscillating frequency is substantially equal to the frequency of the intermediate-frequency signal. Second mixer 28 outputs a signal to demodulator 29 for demodulating the signal, and the demodulated signal is supplied to output terminal 30.

First phase-locked-loop (PLL) circuit 31 is loop-coupled to local oscillator 24, and second PLL circuit 32 is loop-coupled to local oscillator 27. Input ports of PLL circuits 31 and 32 are coupled with crystal oscillator 33 as a reference. The foregoing elements are placed on one printed board in the high-frequency signal receiver in accordance with the first embodiment.

First mixer 25, SAW filter 26 and second mixer 28 are formed of balanced circuits that receive and output two pairs of balanced high-frequency signals. Among those circuits, two balanced high-frequency signals are exchanged simultaneously. Therefore, even if oscillating signals or their harmonics supplied from local oscillator 24 and crystal oscillator 33 enter into mixer 25 or SAW filter 26, the signals cancel the interference since the circuits are formed of the balanced circuits resistant to the interference. As a result, distances between local oscillator 24, mixer 25 and SAW filter 26 can be shortened.

The metallic partition plates between local oscillator 24, mixer 25 and SAW filter 26 can be simplified, thereby allowing the high-frequency signal receiver to be small. According to embodiment 1, low-noise amplifier 22, local oscillator 24, second mixer 28, and local oscillator 27 are formed of balanced circuits, so that oscillating signals or their harmonics supplied from local oscillator 24, crystal oscillator 33, and local oscillator 27 do not enter into amplifier 22.

The balanced circuits are coupled to each other with a balanced circuit, namely, two balanced signal-lines. Mixer 25 and SAW filter 26 are coupled with two signal-lines having the same lengths and inductances, and the two signal-lines have symmetrical shapes to each other. Mixer 25, SAW filter 26, and mixer 28 employ balanced circuits highly resistant to interference, and mixer 26 and filter 26 are coupled with two signal-lines having the same lengths, so that signals in the signal-lines do not shift in phase. Oscillating signals and their harmonics supplied from crystal oscillator 33 and local oscillator 27 may enter into the coupling sections between them and cause interference. However, the structure discussed above eliminates the interference.

The circuits may be formed on a single printed board to form a module and may be surface-mounted. Insertion machines generally available in market can mount the module, so that the receiver can be handled easily.

Figure 2:
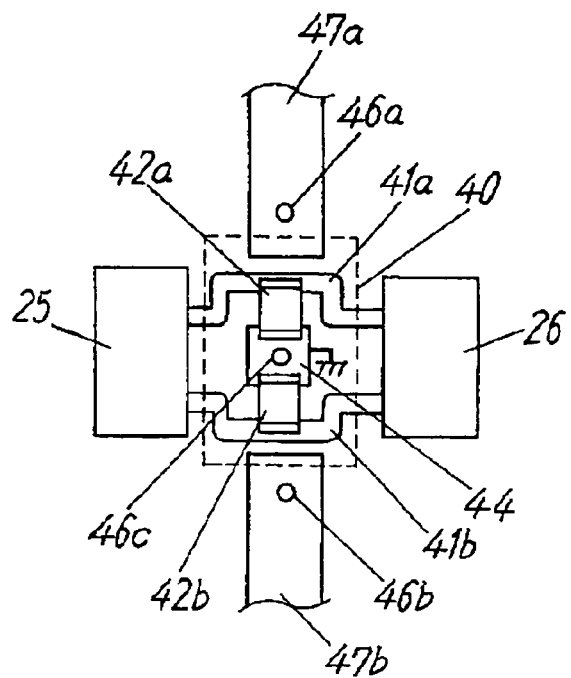
FIG. 2 is a plan view of an essential part of the high-frequency signal receiver in accordance with embodiment 1.
Figure 3:
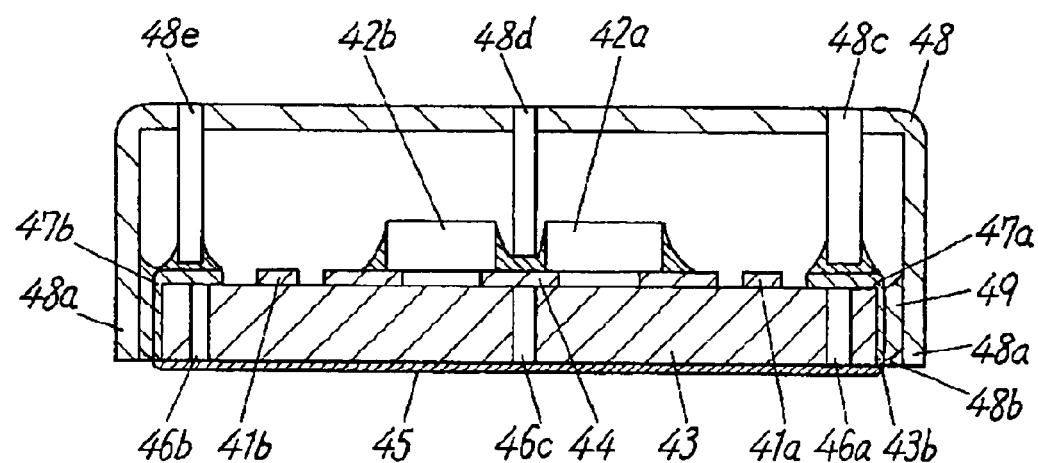
FIG. 3 shows a sectional view of an essential part of the high-frequency signal receiver in accordance with embodiment 1.

FIG. 2 is a plan view illustrating an essential part of the high-frequency signal receiver in accordance with embodiment 1. FIG. 3 shows a sectional view of the receiver shown in FIG. 2. Balanced matching circuit 40 is provided between first mixer 25 and SAW filter 26, both being formed of balanced circuits. In matching circuit 40, chip capacitors 42a and 42b having the same capacitances have respective one ends coupled to two signal-lines 41a and 41b, and respective other ends coupled to connection point 44. Chip capacitors 42a, 42b are directly connected onto multi-layer board 43. The capacitors are mounted to board 43 by reflow-soldering.

Connection point 44 is coupled to ground-plane 45 provided on a rear surface of board 43 via through-hole 46c. Ground patterns 47a, 47b are provided on the surface of board 43 near chip-capacitors 42a, 42b, and are coupled to ground plane 45 at their ends via through-holes 46a, 46b.

That is, two signal-lines 41a, 41b and two chip-capacitors 42a, 42b are symmetrically placed with respect to connection point 44. This structure allows the chip capacitors of the matching circuit to be grounded at a single point, so that the chip capacitors have the same ground potential. The structure thus increases the performance of the balanced circuits and the capability of eliminating interference increases.

Cover 48 made of conductive material covers multi-layer board 43, and is soldered to end face 43b of board 43 at leg 48a with solder 49, so that cover 48 is coupled to ground-plane 45 electrically and mechanically.

Burr 48b prepared at the tip of leg 48a contacts end face 43b, and produces gaps between them. Solder 49 is filled in the gaps, so that leg 48a is soldered to end face 43b. Burr 48b is produced when the metal plate, which is material of cover 48, is cut by a metal die. The metal plate is bent along a cut direction by 90 degrees for providing cover 48 having leg 48a, and burr 48b then has the tip of leg 48a inside.

Conductive members 48c, 48d, and 48e projecting from cover 48 are connected near ground pattern 47a, 47b, and connection point 44 with solder, so that matching circuit 40 has the same ground potential as mixer 25 and SAW filter 26.

Since two signal-lines 41a, 41b coupling mixer 25 and SAW filter 26 have shapes symmetrical to each other, signals passing through lines 41a, 41b do not shift in phase. Noises entering into signal-lines 41a, 41b are thus canceled, and the balanced performance improves. As a result, interference is eliminated.

As shown in FIG. 3, chip capacitor 42a, ground-plane 45, ground-pattern 47a, through-holes 46a, 46c, and cover 48 form a small window surrounded by them. Chip capacitor 42b, ground-plane 45, ground-pattern 47b, through-holes 46b, 46c, and cover 48 form another small window surrounded by them. The windows have the same electric potential as the ground level, and a length of each side of the windows is much shorter than the wavelength of harmonics generated by local oscillator 24 or crystal oscillator 33, so that the harmonics cannot pass through the windows. In other words, the windows allow the metallic partition plates to be eliminated or to be simple plates, and thus allow the receiver of embodiment 1 to be small.

According to embodiment 1, ground-patterns 47a, 47b and connection point 44 are soldered to conductive members 48c, 48d, and 48e projecting from cover 48 near them. The windows thus become smaller, so that high-frequency signals having shorter wavelengths cannot pass through the windows. Cover 48 prevents not only interference coming from the outside but also the signals generated inside of the receiver from interfering with external devices.

Since being mounted on the board by reflow-soldering, chip-capacitors 42a, 42b are accurately mounted because of the self-alignment effect of the reflow-soldering. Therefore, dispersion of the inductance of lines 41a, 41b between mixer 25 and SAW filter 26 can be reduced, so that stable performance of the matching circuit is obtainable.

According to embodiment 1, matching circuit 40 is formed of chip-capacitors 42a, 42b. However, circuit 40 may be formed of reactance elements having reactances equal to each other, namely, the matching circuit can be formed of inductor, and chip-inductors can substitute for the chip-capacitors.

According to embodiment 1, first mixer 25 and SAW filter 26, both being formed of balanced circuits, are coupled with a balanced circuit. However, other circuits may be formed of balanced circuits, and they may be coupled to each other by balanced circuits. All circuits may be coupled with the matching circuit according to embodiment 1 to each other, so that a high-frequency signal receiver has extremely strong capability of eliminating interference.

Local oscillators 24, 27, mixers 25, 27, and filter 26 do not need metallic partition plates between them, so that a cost of the receiver can be reduced. That is, a frame having complicated partition plates is not needed, and a simple cover for shielding only external interference or outgoing leakage high-frequency signals from the receiver operates sufficiently. As a result, an inexpensive high-frequency signal receiver is obtainable.

Further, circuits other than first mixer 25, such as local oscillator 24, and coupling sections between the circuits may be formed of balanced circuits resistant to interference, so that the overall circuits can be strongly resistant to interference. Thus, even if distances between those circuits are very short, oscillating signals from the local oscillators do not enter into the circuits, and S/N ratio of the circuits does not decline. Therefore, the mixer, the local oscillator, and the PLL circuit may be integrated as an integrated circuit (IC). This arrangement provides a compact high-frequency signal receiver having a high productivity. Mixer 28 and local oscillator 27 are formed of balanced circuits, so that they may be integrated in the IC.

Embodiment 2

Figure 4:
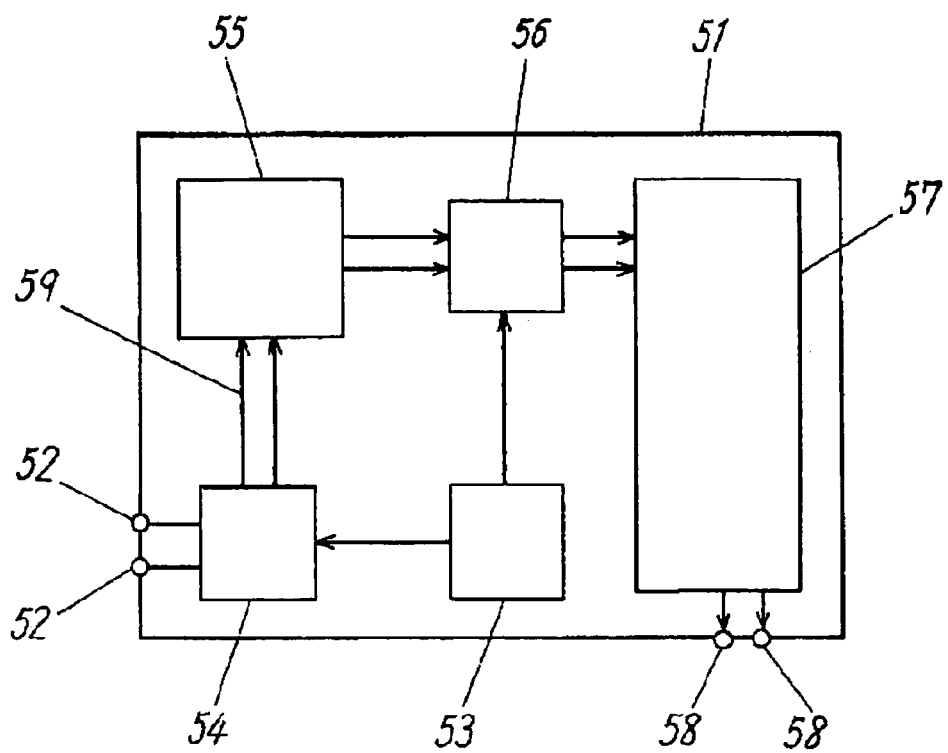
FIG. 4 is a circuit block diagram of a high-frequency signal receiver in accordance with exemplary embodiment 2 of the invention.

FIG. 4 is a circuit block diagram of a high-frequency signal receiver in accordance with exemplary embodiment 2. Input port 52 receives two balanced high-frequency signals, i.e., two signals having the same amplitudes and phases reverse to each other, supplied from an antenna. High-frequency integrated circuit (IC) 54 receives the signals from input port 52 at its first port, and receives an output from crystal oscillator 53 at its second port. High-frequency IC 54 includes low-noise amplifier 22, first mixer 25, local oscillator 24 and PLL circuit 31 of embodiment 1. Surface acoustic wave (SAW) filter 55 receives an output from IC 54 and passes only a necessary intermediate-frequency.

High-frequency IC 56 receives an output from SAW filter 55 at its input port, and receives the output from crystal oscillator 53 at its second input port. IC 56 includes local oscillator 27, mixer 28, and PLL circuit 32 of embodiment 1.

The receiver in accordance with embodiment 2 further includes demodulator IC 57 for receiving an output from IC 56 and a plurality of output terminals 58 to which signals demodulated by IC 57 are supplied. The circuits are provided on printed board 51 having a substantially-rectangular shape.

High-frequency IC 54, SAW filter 55 and high-frequency IC 56 in this order form a letter "L" on printed board 51, and SAW filter 55 is located at the corner of the letter "L". Crystal oscillator 53 is placed at a place equidistant from IC 54 and IC 56. Thus, the four elements are located at respective corners of a rectangle, so that printed board 51 can be efficiently used. This arrangement provides a small, high-frequency signal receiver.

According to embodiment 2, crystal oscillator 53 is placed inside the receiver. However, the oscillator may be provided outside the receiver, thereby allowing the receiver to be small. Crystal oscillator 53 located at an equidistant place from IC 54 and IC 56 produces an advantage similar to that discussed above.

IC 54, SAW filter 55, and IC 56 are formed of balanced circuits, and signal-lines coupling IC 54 and SAW filter 55 have lengths equal to each other for having inductances equal to each other. IC 54, SAW filter 55, and IC 56 formed of balanced circuits having large capability of eliminating the interference, signal-lines 59 between IC 54 and SAW filter 55 having lengths equal to each other and prevents signals in them from shifting in phase. Therefore, even if harmonics of oscillating signals from crystal oscillator 53 enter into the signal-lines between IC 54 and SAW filter 55, or into the signal-lines between IC 54 and SAW filter 55, the foregoing structure allows interference to be canceled.

Therefore, a distance between crystal oscillator 53 and IC 54 as well as a distance between oscillator 53 and IC 56 can be short. Further, a metallic partition plate between crystal oscillator 53 and IC 54, and a partition between oscillator 53 and IC 56 can be simplified or eliminated. Signal-lines between IC 54 and SAW filter 55 have lengths equal to each other for inductances equal to each other, thereby positively canceling the interference.

In the case that the signal-lines between IC 54 and SAW filter 55 cannot have the equal lengths due to a restriction in circuit-layout, a chip inductor may be coupled to the signal-lines in series for obtaining the equal inductances of the signal-lines.

IC 54, SAW filter 55, and IC 56 are placed to form a letter "L" on printed board 51. This structure allows printed board 51 to be shaped substantially in square. This shape allows board 51 to warp little. As a result, the high-frequency signal receiver in accordance with embodiment 2 can be mounted onto a mother board easily.

In the case that the mother board carries an oscillator having an oscillating frequency equal to that of crystal oscillator 53 of the receiver, or that the mother board carries a signal having the same frequency as that of the receiver, the mother board can supply the signal to the receiver as a reference signal, thereby allowing the receiver to be small.

Further, the signal can be supplied through an external terminal close to the circuit that needs the signal, so that the reference signal is not routed in the receiver. This structure allows the signal not to interfere with IC 54, IC 56, and SAW filter 55.

Since crystal oscillator 53 is generally placed equidistantly from IC 54 and IC 56, both the distance between IC 54 and oscillator 53, and the distance between IC 56 and oscillator 53 can be short. Therefore, the oscillating signal and its harmonics of crystal oscillator 53 hardly leak.

According to embodiment 2, single crystal oscillator 53 is used. However, two crystal oscillators corresponding to IC 54 and IC 56, respectively, can be used. In such case, the crystal oscillators are located at substantially-equidistant places from IC 54 and IC 56 producing an advantage similar to discussed above.

Embodiment 3

Figure 5:
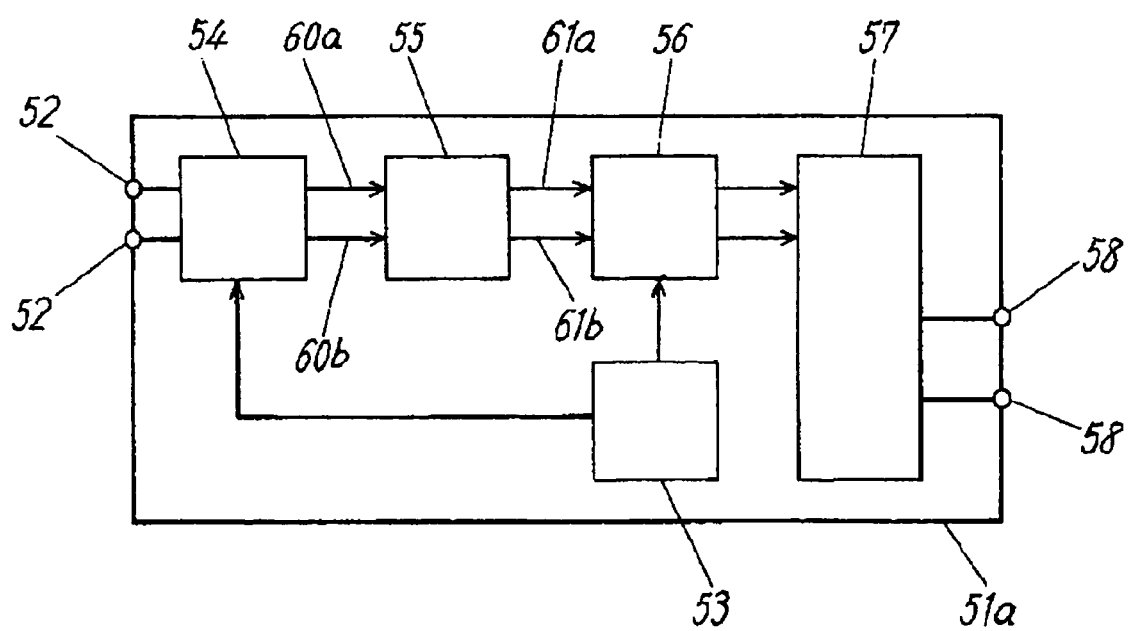
FIG. 5 is a circuit block diagram of a high-frequency signal receiver in accordance with a exemplary embodiment 3 of the invention.
Figure 6:
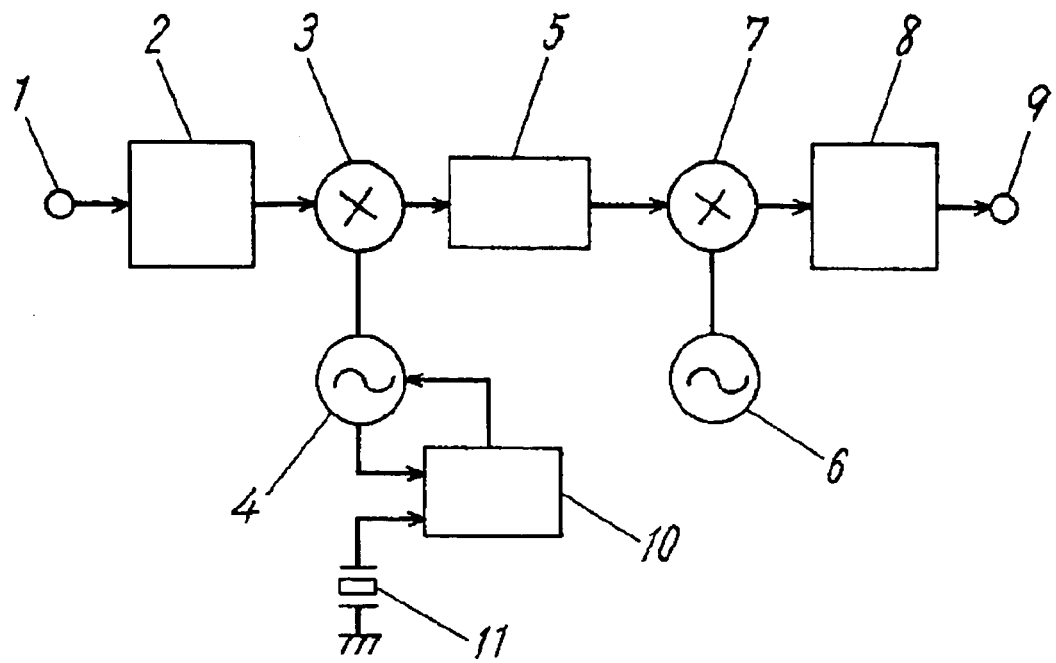
FIG. 6 is a block diagram of a conventional high-frequency signal receiver.
Figure 7:
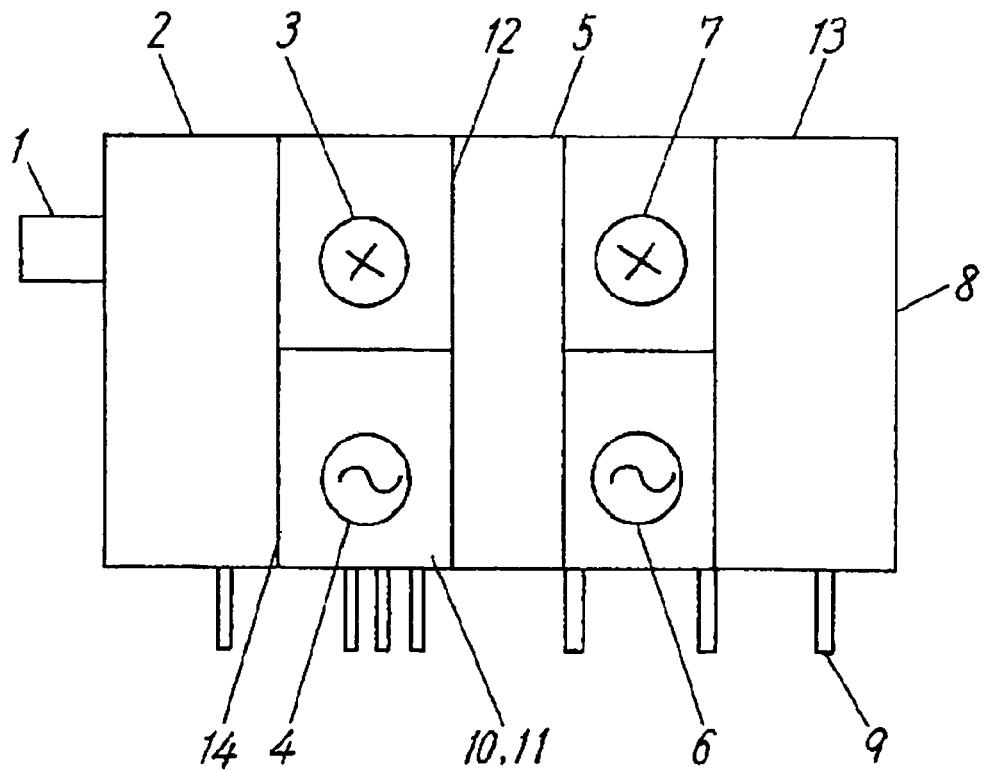
FIG. 7 shows a layout of components of the conventional high-frequency signal receiver.

FIG. 5 shows a circuit-layout of a high-frequency signal receiver in accordance with exemplary embodiment 3 of the present invention. Similar elements to those of embodiment 2 are denoted by the same reference numerals, and detailed descriptions thereof are omitted.

The high-frequency signal receiver in accordance with embodiment 3 includes high-frequency IC 54, SAW filter 55, and high-frequency IC 56 placed in a straight line on printed board 51a. Crystal oscillator 53 is placed closer to IC 56 than to IC 54.

Signal-lines 60a, 60b coupling IC 54 and SAW filter 55 have lengths equal to each other to obtain inductances equal to each other. Further, signal-lines 61a, 61b coupling SAW filter 55 and high-frequency IC 56 have lengths equal to each other to obtain inductances equal to each other. Even if harmonics of oscillating signals from crystal oscillator 53 enter IC 54, SAW filter 55, IC 56, or signal-lines 60a, 60b, 61a, 61b, this structure allows interference of the harmonics to be canceled since IC 54, SAW filter 55, and IC 56 formed of balanced circuits have high capability of eliminating the interference.

Signal-lines 60a, 60b having inductances equal to each other, and signal-lines 61a, 61b have inductances equal to each other since the lengths are the same, so that the signal-lines are balanced, and signals in them do not shift in phase. As a result, the lines cancel the interference. IC 54, SAW filter 55, and IC 56 are placed in a straight line on printed board 51a, and the circuits can thus be placed at minimum distances between them, and a signal loss can be reduced.

The matching circuits of embodiment 1 may be provided between the circuits of the receiver in accordance with embodiments 2 and 3.

INDUSTRIAL APPLICABILITY

A high-frequency signal receiver according to the present invention is formed of balanced circuits. Therefore, even if an oscillating signal and its harmonics from a local oscillator enter into a mixer or a filter, an interference of the signal can be canceled by the balanced circuits. The receiver thus becomes substantially resistant to interference, and S/N ratio of the circuits can be improved, so that distances between the local oscillator, the mixer, and the filter can be short.

Metallic partition plates between the circuits can be eliminated or simplified, so that the receiver can be small, thus being inexpensive. That is, a frame having complicated partition plates is not needed, and a simple cover for shielding only external interference and outgoing leakage high-frequency signals from the receiver operates sufficiently.

Further, circuits, such as the local oscillator and a PLL circuit, which are other than the mixer can be formed of balanced circuits that are highly resistant to interference, so that the overall circuits can hardly accept interference. Thus, even if distances between the circuits are very short, oscillating signals from the local oscillators do not enter into the circuits, and the S/N ratios of the circuits do not decline. Therefore, the mixer, local oscillator, and PLL circuit can be integrated into an IC. This arrangement provides a small, high-frequency signal receiver at a high productivity.

The invention claimed is:

1. A high-frequency signal receiver comprising:
   a first local oscillator including a first phase-locked-loop (PLL) circuit;
   a second local oscillator including a second phase-locked-loop (PLL) circuit;
   a first mixer formed of a balanced circuit having one port for receiving a high-frequency signal and another port for receiving an output from said first local oscillator;
   a filter formed of a balanced circuit for receiving an output from said first mixer;
   a second mixer formed of a balanced circuit having one port for receiving an output from said filter and another port for receiving an output from said second local oscillator;
   a board having said first and second local oscillators, said first and second mixers, and said filter mounted thereto; and
   a crystal oscillator mounted on said board, for oscillating a reference signal for said first and second PLL circuits;
   wherein said first mixer, said filter, and said second mixer are located to form a letter L, and said filter is located at a corner of said letter L; and
   wherein said crystal oscillator, said first mixer, said filter, and said second mixer are located at four corners of a substantial rectangle, respectively.

2. The high-frequency signal receiver of claim 1, wherein said board has a substantially rectangular shape.

3. The high-frequency signal receiver of claim 1, further comprising a plurality of signal-lines coupling said first mixer to said filter.

4. The high-frequency signal receiver of claim 3, wherein said plurality of signal-lines have respective lengths equal to each other.

* * * * *